United States Patent [19]

Kaercher

[11] Patent Number: 4,845,316
[45] Date of Patent: Jul. 4, 1989

[54] STRAIN RELIEVING DEVICE IN COMBINATION WITH ELECTRICAL CABLES

[75] Inventor: Michael Kaercher, Stuttgart, Fed. Rep. of Germany

[73] Assignee: Hewlett-Packard Company, Palo Alto, Calif.

[21] Appl. No.: 87,004

[22] Filed: Aug. 18, 1987

[30] Foreign Application Priority Data

Aug. 20, 1986 [DE] Fed. Rep. of Germany ....... 3628268

[51] Int. Cl.$^4$ .......................................... H02G 15/007
[52] U.S. Cl. .................................. 174/135; 24/129 R; 248/68.1
[58] Field of Search ................ 174/72 A, 135, 138 D, 174/175; 24/115 J, 129 R, 129 D; 439/449, 456, 457, 458, 459, 474; 211/60.1; 248/68.1; 361/428

[56] References Cited

U.S. PATENT DOCUMENTS

| 757,765 | 4/1904 | Osborne | 174/175 X |
| 2,430,980 | 11/1947 | Goodwin | 24/129 R X |
| 3,906,146 | 9/1975 | Taylor | 174/138 D X |
| 4,177,359 | 12/1979 | Naranjo | 174/72 A X |
| 4,224,465 | 9/1980 | Ruzic | 439/459 X |
| 4,297,769 | 11/1981 | Coules | 174/138 D |
| 4,424,627 | 1/1984 | Tarbox | 174/135 X |
| 4,648,680 | 3/1987 | Gamarra | 439/459 |

FOREIGN PATENT DOCUMENTS

| 1246841 | 8/1967 | Fed. Rep. of Germany | 174/175 |
| 2502028 | 7/1975 | Fed. Rep. of Germany | 174/175 |
| 3413254 | 10/1985 | Fed. Rep. of Germany | 174/135 |
| 1179580 | 12/1958 | France | 174/72 A |
| 130830 | 5/1978 | German Democratic Rep. | 174/135 |
| 141883 | 9/1953 | Sweden | 24/129 R |
| 660097 | 3/1987 | Switzerland | 174/135 |

Primary Examiner—Laramie E. Askin
Attorney, Agent, or Firm—Alan H. Haggard

[57] ABSTRACT

A strain relieving device for electric cables of different diameters comprises a base plate and three rows of cylindrical pins extending perpendicularly to a plane of the base plate with the pins of the inner row being asymmetrically offset from the pins of the outer rows. Cables of different diameters are fitted between the pins, where they are retained by friction forces. A strain relieving device of this type facilitates considerably the operation of fitting and exchanging cables without the need for any tool.

11 Claims, 2 Drawing Sheets

STRAIN RELIEVING DEVICE IN COMBINATION WITH ELECTRICAL CABLES

DESCRIPTION

The present invention relates to a strain relieving device in combination with electric cables of different diameters, in particular for computer or main cables.

A strain relieving device serves for connecting or fixing the outgoing cable of an electric device to the latter's housing or chassis in such a manner that when the cable is subject to pull or stress, the resulting forces are transmitted only to the housing or chassis of the device, instead of being transmitted to the circuit boards or the electric components inside the device to which the main cable is connected. Thus, the strain relieving device ensures that the pull or stress acting upon the cable can at best displace the whole device, while any internal damage is excluded.

A known strain relieving device uses a clamping piece. The cable to be fixed is placed on the bottom of the housing, then the clamping piece is applied on it and screwed to the bottom of the housing whereafter the cable so fixed can no longer be pulled out mechanically. Of course, it is also possible to screw the cable in this manner to a wall or to cover of a housing. The screw connection consists usually of threaded bolts which are passed through corresponding bores in the clamping piece, and secured by nuts.

According to another solution, the cable is introduced into a flexible loop which is open on one side. Then the free ends of the loop are screwed to some part of the housing whereby a squeezing effect is exerted upon the cable. However, a strain relieving device of this type is suited only for cables of small to medium diameters, and is also capable of absorbing limited tensile stresses only.

It is common to all these strain relieving devices that detaching the connection is rather laborious and possible only with the aid of tools—mostly screwdrivers or spanners. However, it is a requirement in many cases, in particular in the case of computer applications, to have the possibility of detaching the strain relieving device rapidly, fitting other cables and re-activating the strain relieving device thereafter, with the new cables in place. This may be the case, for example, when interface cables are to be exchanged or when individual components of a computer system mounted on a rack or in a carriage are to be exchanged.

Now, it is a major objective of the present invention to improve a strain relieving device of the type described above in such a manner that the cable or cables can be fixed, detached and exchanged rapidly, in particular with a few manipulations only and without the aid of any tools. According to the invention, this object is achieved by an arrangement in which a base plate carries at least three rows of preferably cylinder-shaped pins, the longitudinal axes of which extend perpendicularly to the plane of the base plate and the spacings of which correspond to at least the diameter of the largest cables to be mounted. Said base plate is connected to a part of the housing—for example by screwing or snap-on connections. Each cable to be fixed is introduced between, i.e. wound around, the pins in alternating directions. Due to the frictional forces encountered in this manner, and the self-locking effect resulting therefrom, each cable is held in place in this manner with sufficient security. Provided the spacing between the pins is selected conveniently (for example only slightly larger than the diameter of the cables to be fixed), even very high tensile stresses can be absorbed.

The strain relieving device according to the invention enables cables to be fitted or exchanged very rapidly, it being necessary only to remove the cables from between the pins and then to insert a new cable. This can be effected with a few manipulations only and does not require the use of any tools. Still, the strain relieving device according to the invention offers properties as favorable as or even better than properties of known strain relieving devices with regard to the stress absorbing capacity.

Strain relieving devices according to the invention can be used with particular advantage in systems which require the frequent addition or exchange of cables. Such systems may consist, for example, of computers using a plurality of interface cards in which case the cables connected to said interface cards each have to be strain relieved. Every time a card is added or exchanged, the line leading to the outside can be fixed or detached rapidly.

Another application of the strain relieving device is seen in computer racks or computer carriages on which a plurality of system components is to be suspended or mounted by some other means. Such components usually comprise a plurality of data cables, and also main cables, which have to be fixed, detached or exchanged rapidly. The ease of manipulation of the strain relieving device according to the invention improves the service value of such equipment.

Advantageously, the height of the pins may correspond to a multiple of the diameter of the cables to be mounted. In this case, a plurality of cables can be introduced between the pins—if desired, with different winding directions—, a solution which may prove particularly advantageous in systems where a great number of cables have to be fixed.

According to another advantageous embodiment of the invention, the pins are arranged in at least three rows extending perpendicularly relative to the main direction of a cable. In this case, several cables can be run through the strain relieving device in parallel. If the pins are given a corresponding height, this increases the number of cables that can be received by the strain relieving device still further.

When the pins are arranged in rows, a particularly favorable solution is obtained when the central row or rows of pins is/are offset relative to the outer rows of pins. This arrangement leads to greater angles of wrap and, thus, to increased static friction when the cables are wound around the pins. As a result, even very high tensile stresses can be absorbed. An additional advantage is provided by an arrangement in which the central row or rows of pins is/are offset asymmetrically relative to the outer rows of pins. This permits cables of different diameters to be fixed in a reliable manner, by guiding the cables with the smaller diameters through the resulting smaller interspaces, and the cables with the larger diameters through the resulting larger interspaces.

The resistance to tensile forces can be further increased by winding the cable several times around individual pins.

According to a preferred embodiment of the invention, the base plate and the pins consist of a plastic material, preferably a tough-elastic plastic material. This enables the strain relieving device to be produced in a very simple manner and at low cost. In addition, this provides a certain elasticity to the device whereby the process of inserting the cables is facilitated, due to being able to spread the pins apart. In addition, the plastic material offers a relatively high coefficient of static friction. And if the pins are shaped as hollow bodies, easy production and, that the same time, savings in material are ensured.

If the strain relieving device is made from a plastic material, it is provided according to an advantageous embodiment of the invention that the base plate is equipped with laterally projecting hook elements and/or snap-in lugs. This permits the base plate to be fastened onto a housing without any tools, simply by engaging the hook elements in corresponding openings in the housing and the snap-in lugs in other openings thereof.

According to still another convenient embodiment of the invention, at least one of the pins is provided on its upper end with locking means, preferably a snap-in lug, for mounting a cover part. Such a cover part prevents the cables from disengaging themselves over the tops of the pins and provides additional rigidity and the necessary stability if the base plate and the pins consist of a relatively soft plastic material.

Other features and advantages of the invention will be apparent from the following detailed description of one preferred embodiment of the invention with reference to the drawing in which.

Figure 1:
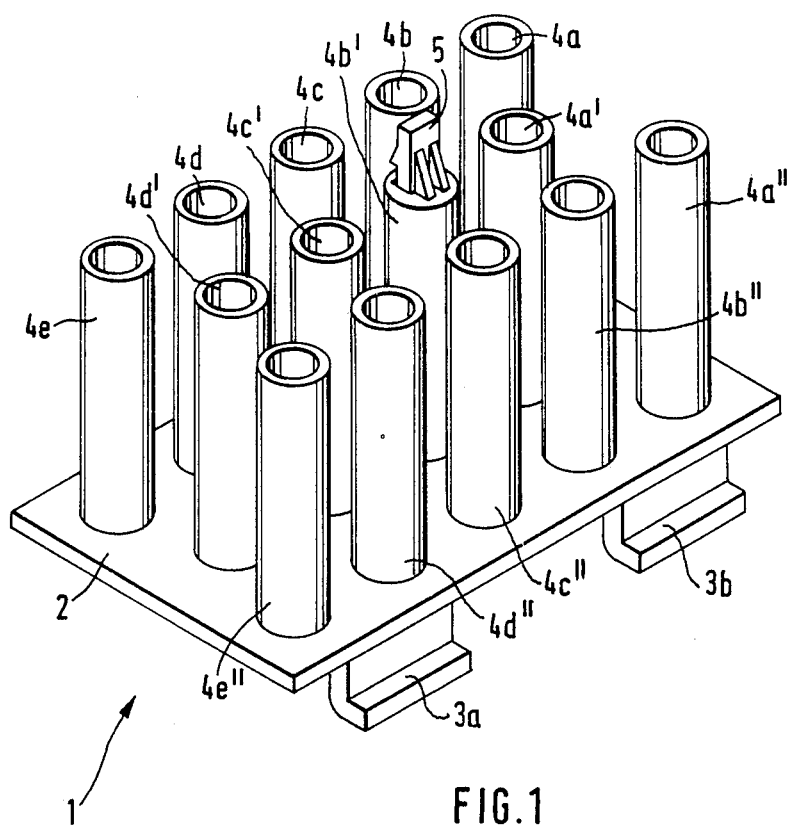
FIG. 1 is a perspective view of a strain relieving device according to the invention.

In FIG. 1, a strain relieving device is designated generally by reference numeral 1. The strain relieving device consists of tough-elastic plastic material and comprises a base plate 2 with hook elements 3a and 3b formed integrally therewith. The hook elements are intended to engage corresponding openings in a housing part. The opposite side of the base plate is provided with snap-in lugs (detents), which are not shown in FIG. 1 but which will be discussed in connection with the other figures. The snap-in lugs are intended for engaging other openings in the housing part.

The base plate 2 carries a plurality of integrally formed hollow-cylindrical pins arranged in three rows 4a to 4e (first row), 4a' to 4d' (second row) and 4a' to 4e'' (third row). The height of the pins corresponds to a multiple of the diameter of the cables to be mounted. This enables several cables to be introduced into the strain relieving device one on top of the other, as permitted by the height of the pins. The manner of running the cables through the device will be described hereafter, with reference to the other figures.

Pin 4b' is provided on its upper end with a snap-in lug or detent 5 intended to be engaged in the opening of a cover part, not shown in the drawing. The latter prevents the cables—for example, when pressure is exerted upon them—from coming off the strain relieving device over the top of the pins. In addition, the side of the cover part facing the pins is provided with recesses which are engaged by the pins. This provides additional stability to the strain relieving device.

Figure 2:
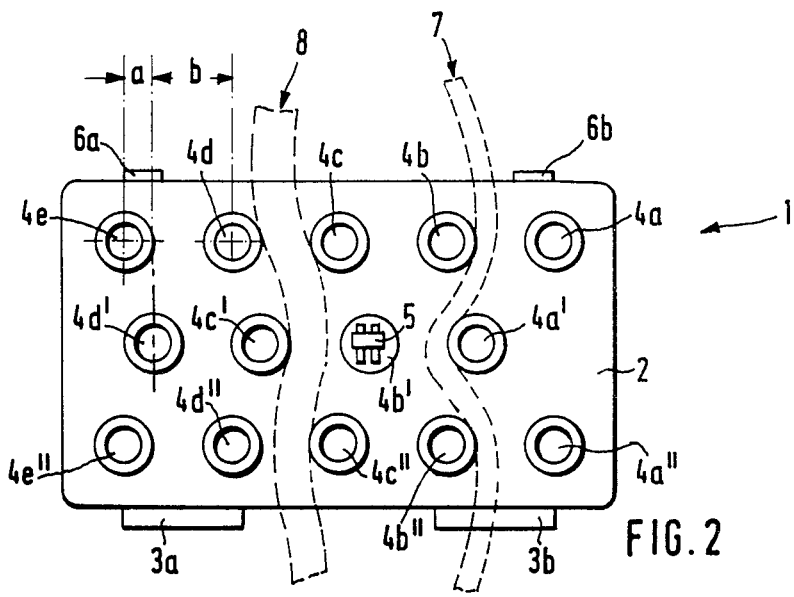
FIG. 2 shows a top view of the part represented in FIG. 1.

FIG. 2 shows a top view of the strain relieving device. Apart from the hook elements 3a and 3b, one further sees the snap-in lugs or detents 6a and 6b. In addition, it can be seen that the central row of pins (pins 4a' to 4d') is offset relative to the outer rows of pins. The offset is asymmetrical, since dimension a is smaller than dimension b (dimension a is the horizontal distance from the center of pin 4e to the center of pin 4d; dimension b is the horizontal distance from the center of pin 4d to the center of pin 4d). Thus, cables of different diameters can be inserted and will be safely retained. Thinner cables can be run in the manner of cable 7 shown in dashed lines, while cables of larger diameters can be run through the larger interspaces, with differently oriented angle of wrap, as indicated by cable 8 shown in dashed lines. However, it is, of course, also possible to run the cables through the strain relieving device in a different manner or to wind them fully around individual pins, once or even several times.

As appears from FIGS. 1 and 2, several cables can be run through the strain relieving device in parallel (perpendicularly to the alignment of the rows of pins). But due to the height of the pins, it is similarly possible to arrange several cables one on top of the other.

Figure 3:
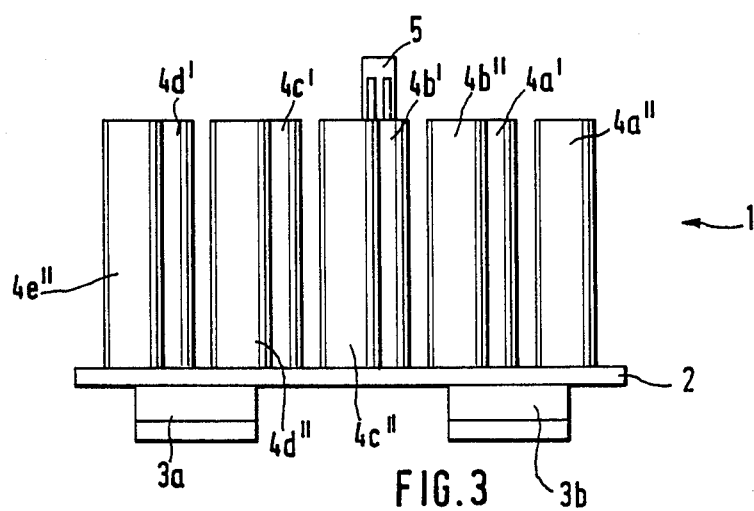
FIG. 3 shows the same part, viewed in the direction indicated by arrow III in FIG. 2.

FIG. 3 shows a view of the strain relieving device taken in the direction of arrow III in FIG. 2. This view shows once more very clearly that the central row of pins (pins 4a' to 4d') is offset asymmetrically relative to the outer rows of pins.

I claim:

1. A strain relieving device in combination with a plurality of cables, comprising: a first cable from the plurality of cables having a first diameter, the first diameter being at least as small as a diameter of any cable in the plurality of cables, and a second cable from the plurality of cables having a second diameter, the second diameter being larger than the first diameter, a base plate (2);

a plurality of pins (4a–4e, 4a'–4d', 4a''–4e''), attached to a plane of the base plate, the longitudinal axis of each pin in the plurality of pins extending perpendicularly to the plane of the base plate (2) and the plurality of pins being arranged into a first row, a second row and a third row, the distance between pins in the first row being at least as large as the second diameter and the distance between pins in the second row being at least as large as the second diameter;

the pins in the second row being asymmetrically offset from the pins in the first row and from the pins in the third row, a section of the first cable entering the strain relieving device through a first pin and a second pin in the first row, exiting the strain relieving device through a third pin and a fourth pin in the third row and being bent around a fifth pin in the second row in such a way that the first pin, the third pin and the fifth pin exert sufficient tension on the first cable to hinder the first cable from being pulled through the strain relieving device, and a section of the second cable entering the strain relieving device through a sixth pin and a seventh pin in the first row exiting the strain relieving device through an eighth pin and a ninth pin in the third row and being bent around a tenth pin in the second row in such a way that the sixth pin, the eighth pin and the tenth pin exert sufficient tension on the second cable to hinder the second cable from being pulled through the strain relieving device.

2. A strain relieving device in combination with a plurality of cables as in claim 1, wherein the height of the pins (4a–4e, 4a'–4d', 4a"–4e") corresponds to a multiple of the first diameter.

3. A strain relieving device in combination with a plurality of cables as in claim 1, wherein the section of each cable lies in a plane perpendicular to the longitudinal axes of the pins.

4. A strain relieving device in combination with a plurality of cables as in claim 1, wherein the base plate (2) and the pins (4a–4e, 4a'–4d', 4a"–4e") consist of a tough-elastic plastic material.

5. A strain relieving device in combination with a plurality of cables as in claim 4, wherein the pins (4a–4e, 4a'–4d', 4a"–4e") are shaped as hollow bodies.

6. A strain relieving device in combination with a plurality of cables as in claim 4, wherein the base plate (2) is provided with hook elements (3a, 3b) for use in mounting the strain relieving device on a housing, the hook elements being attached to and projecting laterally from a first side of the base plate.

7. A strain relieving device in combination with a plurality of cables as in claim 6, wherein the base plate (2) is provided with detents (6a, 6b) for use in securing the strain relieving device to a housing, the detents being attached to and projecting laterally from a second side of the base plate, and the second side being opposite to the first side.

8. A strain relieving device in combination with a plurality of cables as in claim 1, wherein at least one of the pins (4a–4e, 4a'–4d', 4a"–4e") is provided on its upper end with locking means for mounting a cover part.

9. A strain relieving device in combination with a plurality of cables as in claim 8, wherein the locking means is a detent (5).

10. A strain relieving device in combination with a plurality of cables as in claim 1, wherein the pins (4a–4e, 4a'–4d', 4a"–4e") are cylindrical.

11. A strain relieving device in combination with electrical cables, comprising:
   a base plate;
   a plurality of pins, attached to a plane of the base plate, the longitudinal axis of each pin in the plurality of pins extending perpendicularly from the plane of the common base plate, the pins being arranged into a first outer row, at least one inner row and a second outer row, the first outer row, the at least one inner row and the second outer row extending in a first direction perendicular to the longitudinal axes of the pins, pins in the at least one inner row being asymmetrically placed in the first direction with respect to pins in the first outer row and to pins in the second outer row, the pins in the first outer row lining up in a second direction with the pins in the second outer row, but not lining up in the second direction with the pins in the at least one inner row, the second direction being perpendicular to the longitudinal axes of the pins and perpendicular to the first direction;
   a first cable mounted on the strain relieving device entering the strain relieving device in substantially the second direction between a first pin and a second pin in the first outer row, being bent around a third pin in the at least one inner row, and exiting the strain relieving device in substantially the second direction between a fourth pin and a fifth pin in the second outer row, wherein the first pin, the third pin and the fourth pin exert sufficient tension on the first cable to hinder the first cable from being pulled through the strain relieving device; and,
   a second cable mounted on the strain relieving device, the second cable having a different thickness than the first cable, the second cable entering the strain relieving device in substantially the second direction between a sixth pin and a seventh pin in the first outer row, being bent around an eighth pin in the at least one inner row, and exiting the strain relieving device in substantially the second direction between a ninth pin and a tenth pin in the second outer row, wherein the sixth pin, the eighth pin and the ninth pin exert sufficient tension on the second cable to hinder the second cable from being pulled through the strain relieving device.

* * * * *